(12) United States Patent
Barczyk

(10) Patent No.: US 10,640,400 B2
(45) Date of Patent: May 5, 2020

(54) PLASMA REACTOR

(71) Applicant: PROMETEUS SP. Z O.O., Ostrzeszow (PL)

(72) Inventor: Robert Barczyk, Ostrzeszow (PL)

(73) Assignees: Justyna Anna Bak, Minsk Mazowiecki (PL); Waldemar Bernard Slupski, Oberwangen (CH)

( * ) Notice: Subject to any disclaimer, the term of this patent is extended or adjusted under 35 U.S.C. 154(b) by 114 days.

(21) Appl. No.: 15/770,499

(22) PCT Filed: Oct. 24, 2016

(86) PCT No.: PCT/EP2016/075526
§ 371 (c)(1),
(2) Date: Apr. 24, 2018

(87) PCT Pub. No.: WO2017/068178
PCT Pub. Date: Apr. 27, 2017

(65) Prior Publication Data
US 2018/0312413 A1   Nov. 1, 2018

(30) Foreign Application Priority Data
Oct. 24, 2015   (EP) ..................... 15461570

(51) Int. Cl.
*C02F 1/46* (2006.01)
*B01J 19/08* (2006.01)

(52) U.S. Cl.
CPC .......... *C02F 1/4608* (2013.01); *B01J 19/088* (2013.01); *B01J 2219/082* (2013.01);
(Continued)

(58) Field of Classification Search
CPC ......... C02F 1/4608; C02F 1/36; B01J 19/088; B01J 2219/0894; B01J 2219/0898;
(Continued)

(56) References Cited

U.S. PATENT DOCUMENTS

2003/0051991 A1   3/2003   Santilli
2011/0303532 A1   12/2011   Foret
(Continued)

FOREIGN PATENT DOCUMENTS

WO   2010114580   10/2010

OTHER PUBLICATIONS

Park et al. "Reactive nitrogen species produced in water by non-equilibrium plasma increase plant growth rate and nutritional yield", Current Applied Physics, vol. 13, Supplement 1, Mar. 20, 2013, pp. S19-S29, https://doi.org/10.1016/j.cap.2012.12.019 [Abstract provided].

*Primary Examiner* — Lessanework Seifu
(74) *Attorney, Agent, or Firm* — Mark M. Friedman

(57) ABSTRACT

A plasma reactor for enriching water with nitrogen compounds. The plasma reactor includes a water container (8); a plasma head (3) connected with a microwave generator (1) by a waveguide (2); a quartz tube (5) having a first end situated within the plasma head (3) and a second end that protrudes into the water container (8); a gas circulator (9) configured to introduce gas into the first end of the quartz tube (5) so that the introduced gas comes out through the second end of the quartz tube (5); a discharge generating rod (4) configured to be inserted into the plasma head (3) within the quartz tube (5) to generate a discharge in the quartz tube (5) and to be moved out of the head (3) after the discharge has been generated.

9 Claims, 3 Drawing Sheets

(52) U.S. Cl.
CPC ............... *B01J 2219/0809* (2013.01); *B01J 2219/0826* (2013.01); *B01J 2219/0841* (2013.01); *B01J 2219/0869* (2013.01); *B01J 2219/0877* (2013.01); *B01J 2219/0894* (2013.01); *B01J 2219/0898* (2013.01)

(58) Field of Classification Search
CPC ........ B01J 2219/0896; B01J 2219/0877; B01J 2219/0869; B01J 2219/0841; B01J 2219/0826; B01J 2219/0083; B01J 2219/082

See application file for complete search history.

(56) References Cited

U.S. PATENT DOCUMENTS

2012/0297673 A1    11/2012   Keller
2013/0161266 A1    6/2013   Chandran

| Sample number | Time [min] | Nitrate concentration [mg/l] | Nitrite concentration [mg/l] | Total nitrogen [mg/l] | pH |
|---|---|---|---|---|---|
| 0 (tap water) | 0 | 2 | 3 | 0,7 | 7.63 |
| 1 | 8.1 | 66 | 58.9 | 32.8 | 7 |
| 2 | 15.4 | 105.4 | 88 | 50.6 | 6.4 |
| 3 | 20 | 132.9 | 115.4 | 65.2 | 6 |
| 4 | 21.5 | 124 | 122.1 | 65.2 | 5.4 |
| 5 | 23 | 138.2 | 131.8 | 71.4 | 4.5 |
| 6 | 32 | 205.6 | 172.8 | 99.09 | 3.55 |

PLASMA REACTOR

TECHNICAL FIELD

The present invention relates to a plasma reactor. In particular the present invention relates to a microwave plasma reactor for enriching water with nitrogen compounds.

BACKGROUND

There are known plasma reactors for enriching water with nitrogen compounds. Such water enriched with nitrogen and nitrogen compounds can be used to water plants in hydroponic plant breeding.

A publication "Reactive nitrogen species produced in water by non-equilibrium plasma increase plant growth rate and nutritional yield" (by Dayonna P. Park et al, Current Applied Physics 13 (2013) S19-S29), discusses the influence of nitrogen compounds on a plant development and growth process, and subsequently agriculture produce quality. The publication compares three types of plasmas that can be utilized for production of nitrogen compounds: thermal spark discharge, gliding arc discharge and transferred arc discharge.

A PCT patent application WO2010114580A1 discloses an electric plasma arc apparatus and method which allow to produce nitrogen compounds solely using ambient air extracted in proximity to the apparatus. The nitrogen compounds are brought into contact with a water processing system, forming nitrate on-site. It is disclosed that nitrate ions generated in the water processing system which contains the denitrifying microorganisms can enhance oil recovery by means of microbial enhanced oil recovery mechanisms.

There is a need to provide a device for enriching water with nitrogen compounds that would be more efficient and perform better than devices known in the art. Especially, it would be advantageous to provide a device for enriching the water with nitrogen compounds that would be more efficient, while being cheaper and less troublesome in maintenance.

The aim of the present invention is therefore to provide an improved and cost effective apparatus for enriching water with nitrogen compounds.

The object of the invention is a plasma reactor for enriching water with nitrogen compounds comprising: a water container; a plasma head connected with a microwave generator by a waveguide; a quartz tube having a first end situated within the plasma head and a second end that protrudes into the water container; wherein the second end of the quartz tube has an outlet and is positioned so that upon providing water for enriching to the water container, at least the outlet is submersed in water; a gas circulator configured to introduce gas into the first end of the quartz tube so that the introduced gas comes out through the second end of the quartz tube; a discharge generating rod configured to be inserted into the plasma head within the quartz tube to generate a discharge in the quartz tube and to be moved out of the head after the discharge has been generated; wherein the discharge is effected in the quartz tube in a microwave field supplied through the waveguide from the microwave generator, so that the gas passing through the quartz tube is ionized in a plasma discharge; and wherein the outlet comprises plurality of holes so that when the gas leaves the second end of the quartz tube it is released in form of gas bubbles.

Preferably, the gas circulator is adapted to draw gas from above the water surface in the water container when provided with water for enriching and to direct this gas to the first end of the quartz tube.

Preferably, the plasma reactor further comprises a vibration generator with a vibration conducting element protruding into the water container.

Preferably, the vibration generator is an ultrasonic vibration generator.

Preferably, the outlet has a plate-like shape.

Preferably, the quartz tube, after providing water to be enriched, is submersed at least 30 cm in water.

Preferably, the holes have a diameter below 1 mm.

Preferably, the holes have a diameter below 0.5 mm.

Another object of the invention is a method for enriching water with nitrogen compounds comprising: providing a water container; providing a plasma head connected with a microwave generator by a waveguide; providing a quartz tube having a first end situated within the plasma head and a second end that protrudes into the water container; providing water for enriching to the water container in an amount such that an outlet at the second end of the quartz tube is submersed in water; introducing, by a gas circulator, gas into the first end of the quartz tube so that the introduced gas comes out through the second end of the quartz tube, wherein the outlet comprises plurality of holes so that when the gas leaves the second end of the quartz tube it is released in form of gas bubbles; inserting a discharge generating rod into the plasma head within the quartz tube; supplying to the quartz tube, through the waveguide from the microwave generator, a microwave field; generating a discharge in the quartz tube, so that the gas passing through the quartz tube is ionized in a plasma discharge; and removing the discharge generating rod from the plasma head after the discharge has been generated.

BRIEF DESCRIPTION OF DRAWINGS

These and other objects of the invention presented herein, are accomplished by providing a plasma reactor. Further details and features of the present invention, its nature and various advantages will become more apparent from the following detailed description of the preferred embodiments shown in a drawing, in which.

DETAILED DESCRIPTION

Figure 1:
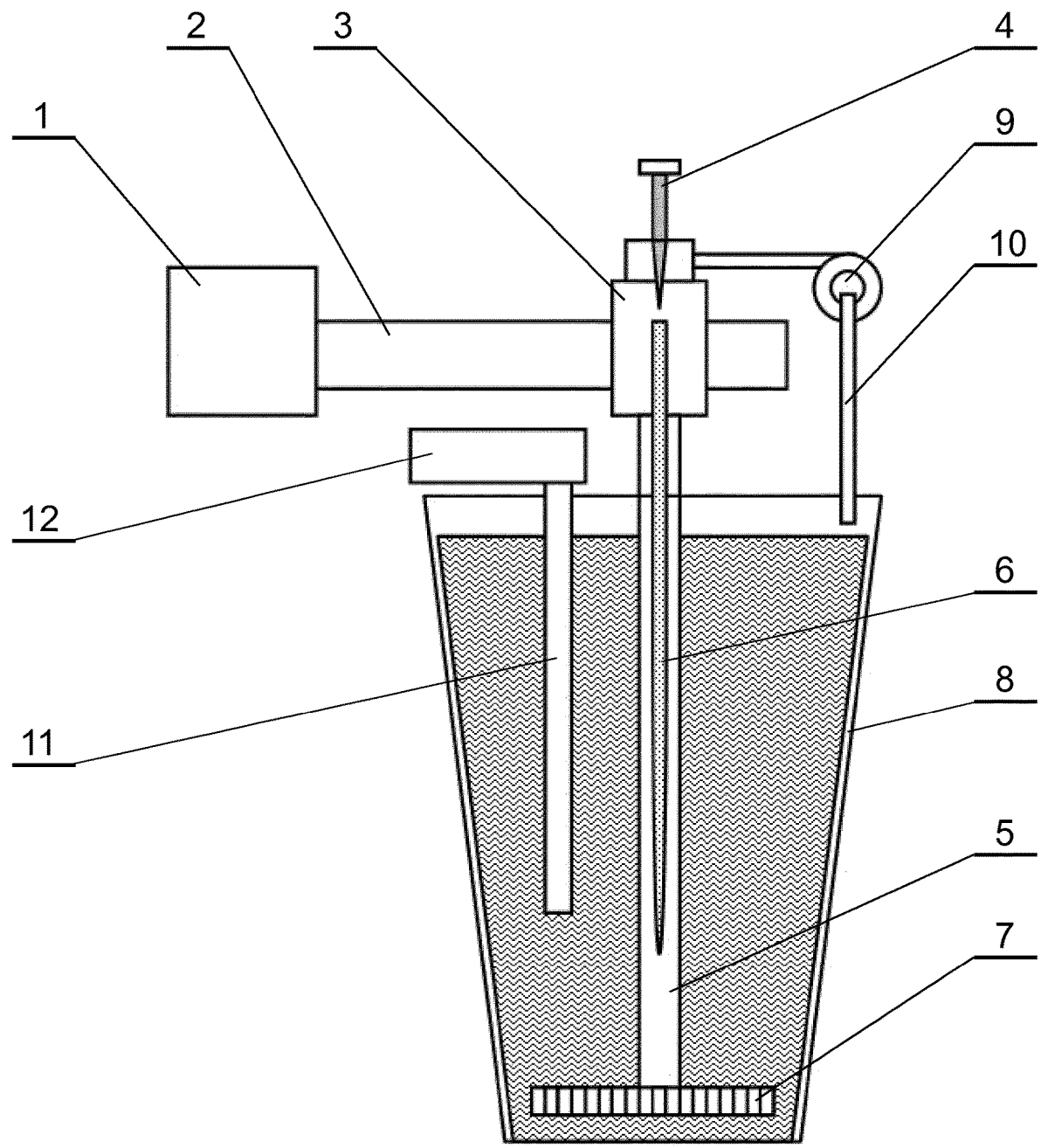
FIG. 1 presents a plasma reactor in the first view.

FIG. 1 presents a plasma reactor according to the present invention. The plasma reactor comprises a water container 8, to which there is supplied water for enriching with nitrogen compounds. Preferably, water fills the larger part of the container 8. The water container 8 can have a shape of a cylinder with a bottom substantially parallel to the ground.

The reactor further comprises a plasma head 3, which functions as a main element of the plasma reactor, serving as a connection element for other essential parts. The plasma head 3 is connected with a microwave generator 1 using a waveguide 2. The generator may have a power of the order of 1000 W and operate in the frequency band from 900 Mhz to 4 Ghz. The waveguide 2 preferably has a rectangular cross-section, with one side wider than the other. Within the plasma head 3, there is mounted a quartz tube 5. The first end of the quartz tube 5 is positioned within the plasma head 3, while its second end protrudes into the water container 8. Preferably, the quartz tube 5 is arranged perpendicularly with respect to the bottom of the water container 8. The quartz tube can withstand high temperatures and thermal shocks. Moreover, it does not absorb ultraviolet radiation, so that the ultraviolet radiation emitted by the plasma is transmitted to the water. It thereby enhances the process of water modification (i.a. a production of ozone occurs).

The second end of the quartz tube 5 has an outlet 7. The quartz tube 5 is positioned so that upon providing water for enriching to the water container 8, at least the outlet 7 is submersed in water.

The plasma reactor further comprises a gas circulator 9, such as a pump, configured to introduce gas into the first end of the quartz tube 5. The introduced gas subsequently leaves the quartz tube 5 at its second end, through the outlet 7. The outlet 7 comprises plurality of holes so that when the gas leaves the second end of the quartz tube 5, it is released in form of gas bubbles, which move in the water being subjected to the enrichment process in an upward direction. This provides them with opportunity to dissolve in the water during travel. The holes should be of such dimensions so as to produce small bubbles. For example, their diameter should be equal or smaller than 2 mm.

The plasma head 3 is equipped with a discharge generating rod 4. The discharge generating rod 4 is configured to be inserted into the plasma head 3 within the quartz tube 5 to generate an electric discharge in the quartz tube 5 and to be moved out of the plasma head 3 after the discharge has been generated. The rod 4 generates sparks, which initiate a plasma discharge. After initiation the rod 4 has to be quickly removed from the plasma discharge area, to avoid melting of the rod 4 and polluting the quartz tube 5 with metal sprayed from the rod 4.

The rod 4 is made of metal. The discharge is effected in the quartz tube 5 in a microwave field supplied through the waveguide 2 from the microwave generator 1. This leads to partial ionization of the gas passing through the quartz tube 5, and generation of excited particles comprising nitrogen. More specifically, there is a section of the quartz tube 5 in which the gas plasma is produced, and the supplied gas passes through it. The section of the quartz tube 5, in which gas plasma occurs, is usually located inside the waveguide 2—that is in the upper part of the quartz tube 5. Due to microwave absorption the plasma develops (gets longer) along the quartz tube 5 almost to the end of this tube (for example 15-20 cm), depending on the velocity of the air flow inside the quartz tube 5. As stated above, gas treated in this manner leaves the quartz tube 5 through the outlet 7, and more precisely through the plurality of holes in the outlet 7, and subsequently is dissolved into water. Supplying the gas into water in a form of small, dispersed gas bubbles enhances the effectiveness of enrichment process, as smaller gas bubbles dissolve more easily.

Figure 2:
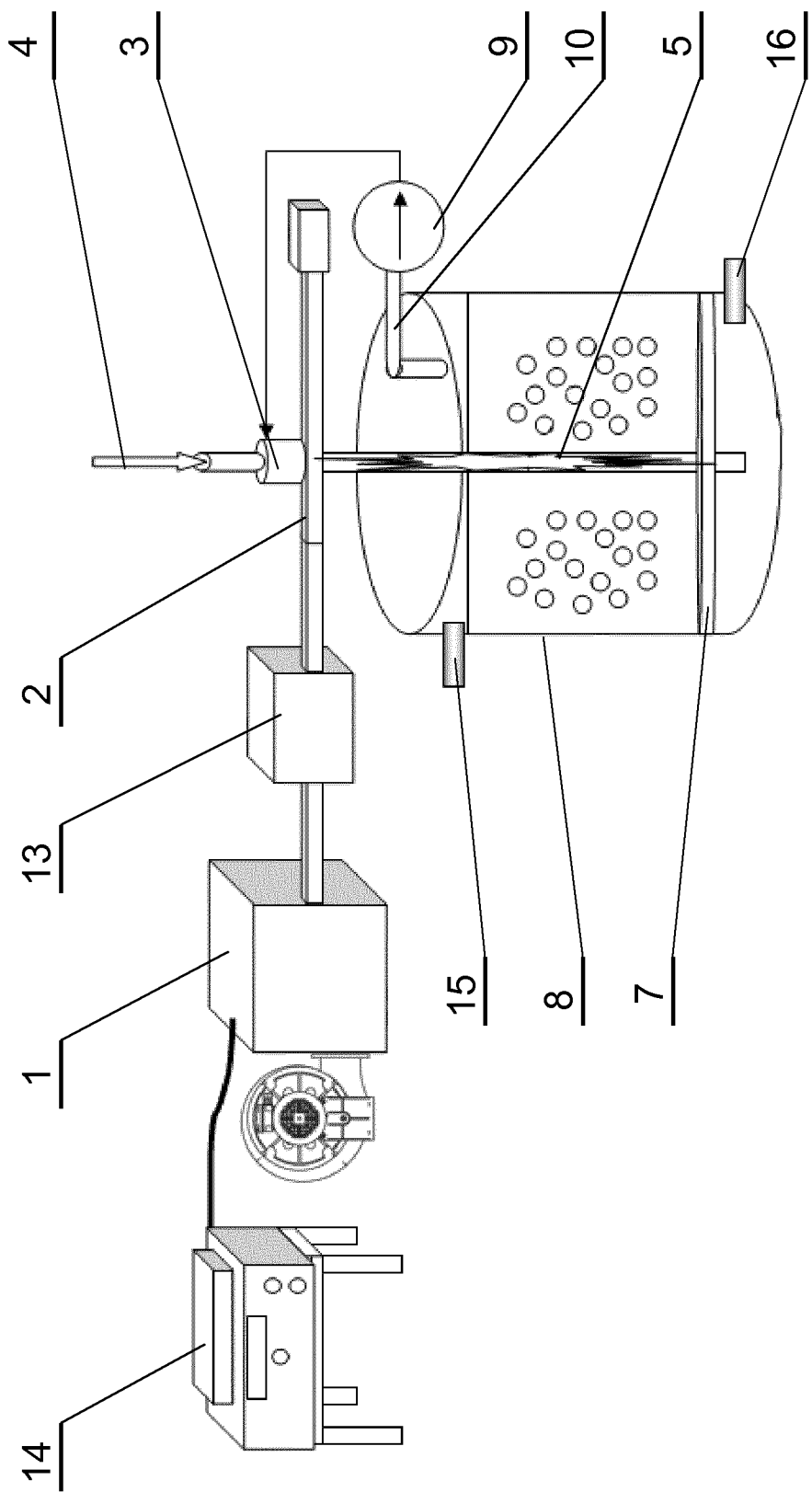
FIG. 2 presents a plasma reactor in the second view.

The gas circulator 9 introduces gas into the quartz tube 5. The gas can be for example the air, preferably drawn from the air surrounding the plasma reactor. The gas can be drawn from other external sources, e.g. gas tanks or other gas supply infrastructures. Additionally, the gas circulator 9 can be adapted to draw gas from above the water surface in the water container 8 when provided with water to be enriched and to direct this gas to the first end of the quartz tube 5. This can be realized by providing a ventilator or a gas pump 9 for drawing the gas through an air channel 10 connected to the water container 8 in its upper part, for example as shown in FIG. 1 or FIG. 2. Such recirculation prevents emission of the not yet dissolved, harmful nitrogen compounds to the environment, as well as enhances the efficiency of the whole process.

The outlet 7 is shaped so that it generates small gas bubbles, with holes preferably uniformly dispersed within the cross-section plane of the water container. It can have a plate-like shape with uniformly or non-uniformly located small openings, or it may comprise plurality of tubes connected to the second end of the quartz tube 5, wherein each one from the plurality of tubes has small holes for generation of gas bubbles upon submersion in a liquid. Preferably, the holes have a diameter below 1 mm. Preferably, the holes have a diameter below 0.5 mm. The plurality of tubes can be arranged so that they are directed outwardly with respect to the second end of the quartz tube 5 in a uniform matter, so that the gas bubbles are produced throughout the cross-section of the water container 8 parallel to the ground.

The plasma reactor may further comprise vibration generating arrangement. This vibration generating arrangement can comprise a generator 12 with a vibration conducting element 11 protruding into the water container 8, and may be submersed in water to be enriched. The generator 12 generates mechanical vibrations in a band of between 20 kHz and 40 kHz. Preferably, the vibration generator 12 is an ultrasonic vibration generator. The vibrations are introduced using the element 11, preferably a rod or a plate, into water, which allows to disintegrate gas bubbles leaving the outlet 7 before they reach the water surface.

Element 6 shown in the drawing represents schematically a plasma column, i.e. the ionized gas.

FIG. 2 presents an exemplary arrangement according to the invention. The microwave generator 1, working at 2.45 GHz frequency and generating microwaves with a power of 3 kW, is connected to the power adapter 14. It is preferable to use low ripple power supplies. The usage of high ripple power adapters is also possible, provided that the ripples are of frequency higher that 150-200 Hz. If the frequency is too low, the plasma can disappear in-between the pulses—the discharge will dissipate. As can be seen, a microwave circulator 13 can be additionally provided between the microwave generator 1 and the plasma head 3, in which the electromagnetic waves bounced with the plasma head within the waveguide will be absorbed in the water load located in one of the gates of the circulator. This protects the generator (magnetron) from the disadvantageous influence of the reflected wave. Such reflected wave causes generation of so called standing wave, wherein in the areas of local maxima sparks can occur. The circulator significantly prolongs the working time of lamp generators (magnetrons).

The discharge rod 4 is shown symbolically in form of an arrow, which indicates the direction in which it is inserted into the plasma head 4. The discharge rod 4 is preferably made of wolfram or material of high melting point.

FIG. 2 presents a water container 8 with a water inlet 15 for providing water to be enriched and a water outlet 16, which is suitable for releasing water after enrichment process out of the water container 8.

The quartz tube 5 preferably crosses the wider sides of the rectangular cross-section of the waveguide 2. The electric field strength is strongest within the quartz tube 5. This allows for easier discharge initiation (spark generation from the rod introduced into quartz tube 5) and improves transmission of microwave energy to already generated plasma.

Preferably, the quartz tube 5, upon providing water to be enriched, is submersed at least 30 cm in water. This provides sufficiently long time for a bubble travelling from the outlet 7 to the water surface to be dissolved in water.

Experimental results:

The water container has been filled with 30 liters of pure tap water. The microwave generator 1, working at 2.45 GHz+/−50 MHz frequency and generating microwaves with a power of 2 kW has been used. The volume flow rate of the gas was 12 l/min. After plasma initiation the pH level changes in time have been measured and samples have been taken. The experiment was carried out without gas recirculation. The measurement results are shown in FIG. 3.

Moreover, in order to verify the obtained data, the second experiment was carried out, in which the water of pH of 3.60 was treated for 28 minutes in the reactor chamber. The treatment conditions, i.e. microwave generator frequency and power as well as the gas flow rate were the same as in first experiment. The concentration of nitrates and nitrites was examined after 24 hours from the water treatment. The obtained results confirmed enhanced reactor efficiency. The concentration of nitrates ($NO_3^-$) in the treated water was 311 mg/l and the concentration of nitrites ($NO_2^-$) in the treated water was 168.3 mg/l.

Figures 3, 4:
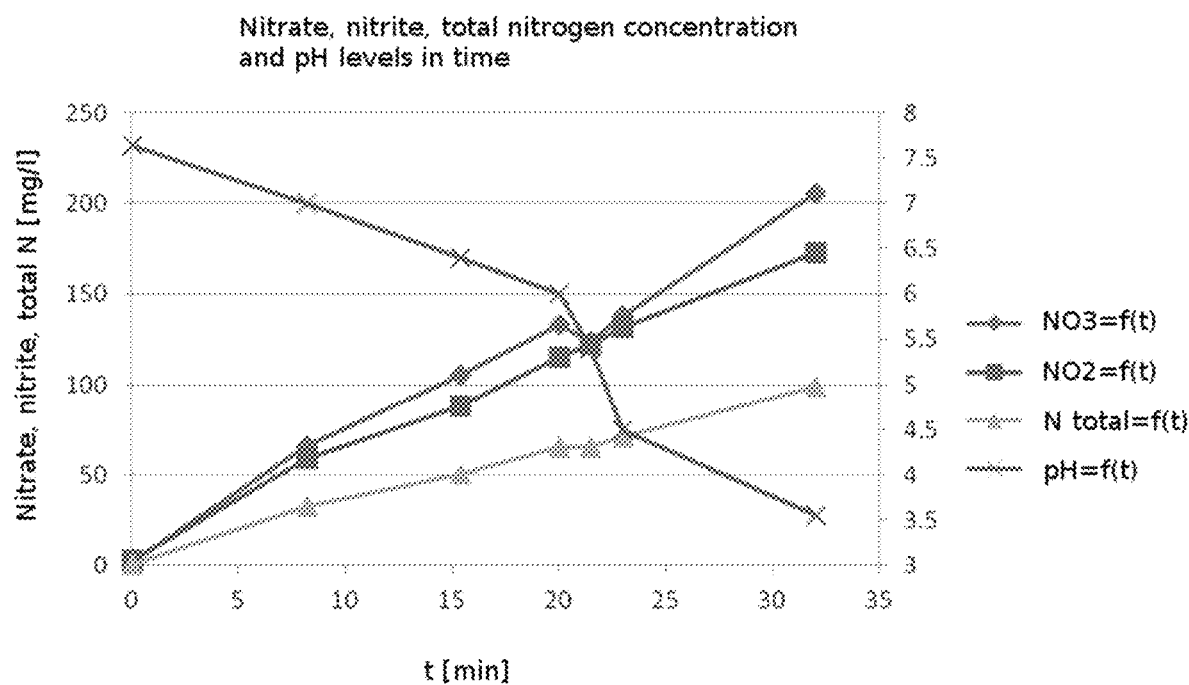
FIG. 3 shows experimental measurements.
FIG. 4 shows plotted measurements.

FIG. 4 shows plotted experiment results. As can be observed, the pH levels are inversely correlated with concentration levels of nitrates, nitrites and total nitrogen. This allows for convenient and efficient control of the process by simply measuring pH levels.

The reactor according to the present disclosure shows improved efficiency, comparing to the known plasma generating apparatus.

In the presented reactor, the developed system, comprising plasma head connected with microwave generator, enables generation of the conditions (atmosphere) of the suitable oxidizing character. In such conditions, upon treatment of the water with the air bubbles, the free-radicals and other strong oxidizers are produced. The nitrogen contained in the air (about 79% v/v of $N_2$) undergoes reactions that give nitrogen oxides as the reaction products. Nitrates and nitrites constitute an important component of plant fertilizers.

The invention claimed is:

1. A plasma reactor for enriching water with nitrogen compounds comprising:
    a water container;
    a plasma head connected with a microwave generator by a waveguide;
    a quartz tube having a first end situated within the plasma head and a second end that protrudes into the water container;
    wherein the second end of the quartz tube has an outlet and is positioned so that upon providing water for enriching to the water container, at least the outlet is submersed in water;
    a gas circulator configured to introduce gas into the first end of the quartz tube so that the introduced gas comes out through the second end of the quartz tube;
    a discharge generating rod configured to be inserted into the plasma head within the quartz tube to generate a discharge in the quartz tube and to be moved out of the head after the discharge has been generated;
    wherein the discharge is effected in the quartz tube in a microwave field supplied through the waveguide from the microwave generator, so that the gas passing through the quartz tube is ionized in a plasma discharge; and
    wherein the outlet comprises plurality of holes, so that when the gas leaves the second end of the quartz tube, it is released in form of gas bubbles.

2. The plasma reactor according to claim 1, wherein the gas circulator is adapted to draw gas from above the water surface in the water container when provided with water for enriching and to direct this gas to the first end of the quartz tube.

3. The plasma reactor according to claim 1, further comprising a vibration generator with a vibration conducting element protruding into the water container.

4. The plasma reactor according to claim 3, wherein the vibration generator is an ultrasonic vibration generator.

5. The plasma reactor according to claim 1, wherein the outlet has a plate-like shape.

6. The plasma reactor according to claim 1, wherein the quartz tube, after providing water to be enriched, is submersed at least 30 cm in water.

7. The plasma reactor according to claim 1, wherein the holes have a diameter below 1 mm.

8. The plasma reactor according to claim 1, wherein the holes have a diameter below 0.5 mm.

9. A method for enriching water with nitrogen compounds, comprising the steps of:
    providing a water container;
    providing a plasma head connected with a microwave generator by a waveguide;
    providing a quartz tube having a first end situated within the plasma head and a second end that protrudes into the water container;
    providing water for enriching to the water container in an amount such that an outlet at the second end of the quartz tube is submersed in water;
    introducing, by a gas circulator, gas into the first end of the quartz tube so that the introduced gas comes out through the second end of the quartz tube, wherein the outlet comprises plurality of holes so that when the gas leaves the second end of the quartz tube it is released in form of gas bubbles;
    inserting a discharge generating rod into the plasma head within the quartz tube;
    supplying to the quartz tube, through the waveguide from the microwave generator, a microwave field;
    generating a discharge in the quartz tube, so that the gas passing through the quartz tube is ionized in a plasma discharge; and
    removing the discharge generating rod from the plasma head after the discharge has been generated.

* * * * *